Nov. 21, 1933.                A. P. LESER                 1,936,249
                              SHOWER PIPE
                           Filed June 9, 1932
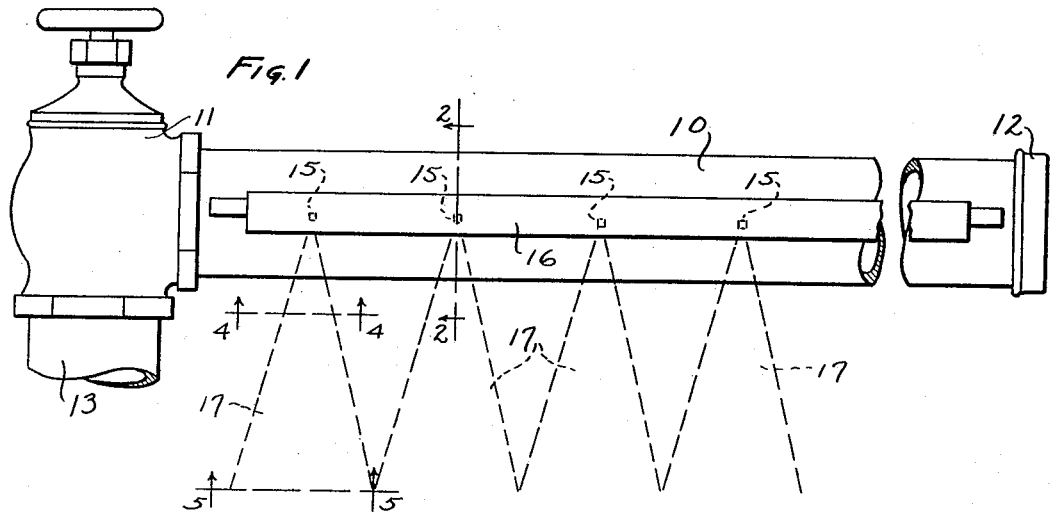
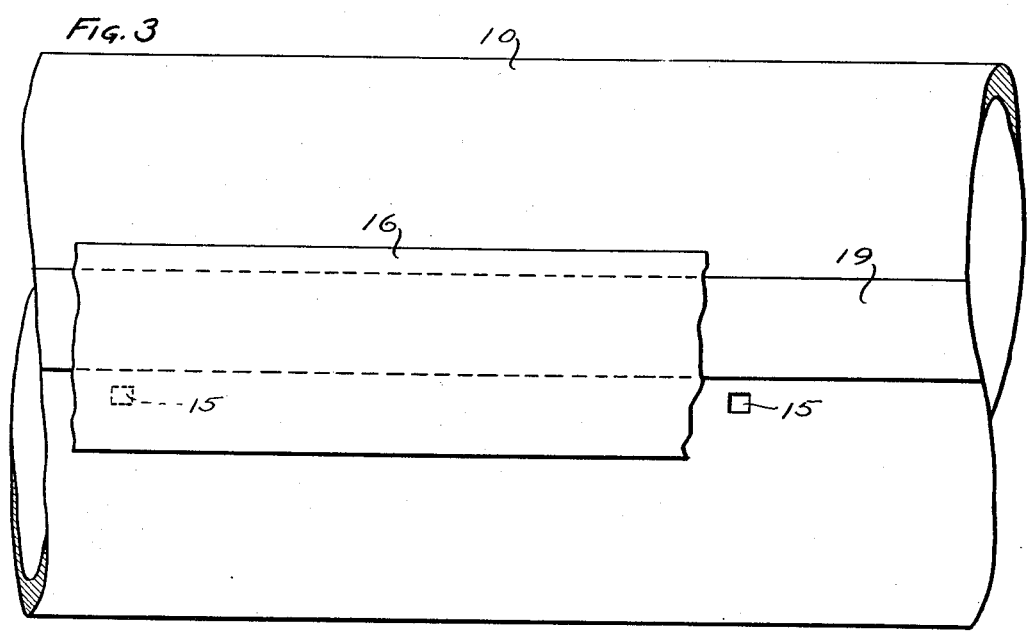
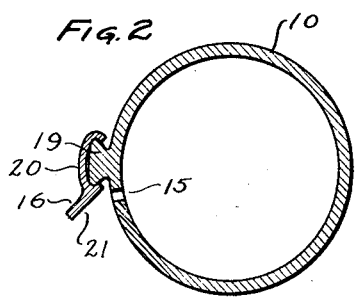  
Inventor
Arthur P. Leser
By Maréchal & Noe
Attorney Patented Nov. 21, 1933

1,936,249

UNITED STATES PATENT OFFICE 1,936,249

SHOWER PIPE

Arthur P. Leser, Sandusky, Ohio, assignor to The Paper & Textile Machinery Company, Sandusky, Ohio, a corporation of Ohio Application June 9, 1932. Serial No. 616,200

1 Claim. (Cl. 299—104)

This invention relates to shower pipes.

The principal object of this invention resides in the method of and apparatus for producing an effective and forceful fluid spray of sheet like form and of substantially uniform volume and intensity throughout its extent, but which requires a minimum amount of liquid in a unit of time.

Another object of the invention is the provision of a shower pipe comprising related jet openings of improved form for producing an effective flat spray as a substantially plane surfaced sheet.

Other objects and advantages of the invention will be apparent from the following description, the accompanying drawing and the appended claim.

In the drawing, which discloses a preferred embodiment of the invention,—

Fig. 1 is an elevational view of a shower pipe constructed in accordance with the present invention;

Fig. 2 is a sectional view taken on the line 2—2 of Fig. 1;

Fig. 3 is an enlarged fragmentary elevational view of the shower pipe with certain parts broken away for clearness of illustration;

Fig. 4 is a diagrammatic illustration of the spray cross sectional form taken on the line 4—4 of Fig. 1; and Fig. 5 is a diagrammatic showing similar to Fig. 4 and taken on the line 5—5 of Fig. 1.

The drawing, in which like characters of reference designate like parts throughout the several views thereof, illustrates a shower pipe which is adapted to be mounted in any suitable manner for projecting fluid sprays upon any desired surface. The shower pipe comprises a fluid conduit 10 in the form of a cylindrical pipe having a control valve 11 at one end and a cap like closure 12 at the opposite end. The valve 11 is attached to a pipe 13 which is connected to a source of water or other fluid supply under suitable pressure. Axially aligned and spaced openings 15 are provided in the conduit 10 and serve as nozzles for directing fluid jets from the conduit. A deflector 16 which is shown attached to the pipe 10 is positioned so as to intercept the fluid jets and redirect them as aligned fan like sprays as indicated in dotted outline at 17 in Fig. 1. The deflector may be of any suitable form and in the illustrated embodiment of the invention it is arranged as in Patent 1,788,469 to P. H. Meilke granted January 13, 1931. As shown, the conduit 10 has an integrally formed axially extending dovetailed rib 19 which serves for attachment of a channel like portion 20 of the deflector. A plate projection 21 having a flat liquid deflecting surface extends from the channel portion 20 and is positioned at an acute angle to the direction of flow of the fluid jets from the openings 15 so as to intercept and redirect these fluid jets. The jets upon striking the plate 21 are deformed into a fan like spray. The spacing of the openings 15 and proportioning of the parts is such that the separate sprays will merge at some predetermined and desired distance from the pipe.

Shower pipes, such as that just described, are used in industry generally where it is desired to project a fluid spray of generally sheet like form. Shower pipes find many uses especially in the paper making industry for spraying and cleansing paper making wires, felts and various other parts of the paper making machines that must be kept free of adhering fibers or foreign substances for efficient operation. As the shower pipes operate continuously a considerable quantity of water is consumed in a day's run.

Heretofore shower pipes have been constructed with nozzles in the form of circular jet openings which are formed in the conduit by drilling round holes therein at a desired axial spacing. The holes direct jets of circular cross section toward the deflector and these are redirected as fan like sprays which in cross section perpendicular to the line of flow are of elliptical form. These redirected sprays will merge at some distance from the shower pipe to form an approximately continuous spray, but with a spray jet of elliptical form the volume and intensity is not uniform throughout its extent; the flow being greatest at the central part of each jet flow and tapering off to a smaller flow at each end of the jet spray. In order to obtain effective cleansing from a plurality of related jets of elliptical form it is necessary that these jets be so proportioned and positioned that the flow at the point of merging of adjacent sprays is sufficient to provide the desired cleansing action. When such conditions obtain the spray flow intermediate the points of merging is considerably more than is required for effective cleansing, consequently needless quantities of water are used by such a construction. As mentioned, these shower pipes operate continuously, consequently the wasteful jet form produced by the series of related elliptical sprays necessitates the pumping of considerably more water than is required for effective cleansing because if there is sufficient volume and intensity of flow at the junction of adjacent sprays there must be more than sufficient flow at the wide part of each elliptical spray.

This invention provides for sprays in which the flow is uniformly distributed so that at the line at which the individual sprays merge a sheet like flow is provided which is substantially constant in volume and intensity throughout its extent. Such a spray form not only provides an effective and uniform cleansing action but also permits a considerable saving in the quantity of water used. This improved spray form results from the use of jet openings of substantially rectangular cross section, preferably square as indicated on Fig. 3. These jet openings are readily produced by drilling circular holes at the desired spacing in the conduit 10 and then broaching these holes to the desired shape. As shown, the jet openings are made so that the upper and lower walls stand parallel with the pipe axis and with the plane of the deflecting surface of member 21. The fluid jets projected from such openings strike the deflector plate 21 and are redirected as fan like sprays of substantially pyramidal form in which the volume and intensity of flow is substantially uniform throughout the extent of the spray at any given distance from the deflector 21. The form of deflected spray after it leaves the deflector plate 21 is indicated diagrammatically in Fig. 4, the opposite boundary portions being straight. This spray form is retained as the spray diverges so that when the adjacent sprays merge, as indicated at the section line 5—5 and shown in Fig. 5, a continuous and substantially plane surfaced sheet results in which the volume and intensity of flow at any one point is substantially the same as that at any other point in the full extent of the spray sheet. By providing such a spray form a uniform cleansing action is produced with no waste of cleansing water.

The holes 15 may for example be about one-eighth inch square and spaced about three inches or so apart, although the center to center spacing of the jet openings 15 and the area of these individual openings may be proportioned to provide any desired volume and intensity of flow to meet the particular conditions of flow requirements. In any case the individual jet sprays will merge into a continuous spray simulating a plane surfaced sheet with no irregularities of volume or flow intensity such as result from the use of circular jet openings.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claim.

What is claimed is:

A shower pipe comprising a fluid conduit, said conduit having a plurality of axially spaced rectangular jet openings therein aligned parallel with the conduit axis, said jet openings each having a flat side extending parallel to the axis of the conduit, and a deflector plate supported on said pipe and extending parallel with the axis of the conduit in an inclined position with relation to the path of streams issuing from the rectangular jet openings to deflect and alter such individual streams into sheet like streams merging into a continuous shower of uniform volume and intensity.

ARTHUR P. LESER.